United States Patent
Imai et al.

(10) Patent No.: US 7,580,215 B2
(45) Date of Patent: Aug. 25, 2009

(54) DISK DRIVE APPARATUS AND IMAGING APPARATUS HAVING THE DISK DRIVE APPARATUS FOR CONTROLLING A STATE THEREOF BASED ON A DETECTED TEMPERATURE

(75) Inventors: Kenichiro Imai, Kanagawa (JP); Katsuhiko Watanabe, Saitama (JP); Kou Kobayashi, Tokyo (JP); Tetsuo Morimoto, Kanagawa (JP)

(73) Assignee: Sony Corporation (JP)

( * ) Notice: Subject to any disclaimer, the term of this patent is extended or adjusted under 35 U.S.C. 154(b) by 305 days.

(21) Appl. No.: 11/635,453

(22) Filed: Dec. 6, 2006

(65) Prior Publication Data

US 2007/0146923 A1 Jun. 28, 2007

(30) Foreign Application Priority Data

Dec. 28, 2005 (JP) .............................. 2005-377666

(51) Int. Cl.
G11B 19/02 (2006.01)
(52) U.S. Cl. ...................................................... 360/69
(58) Field of Classification Search ................. None
See application file for complete search history.

(56) References Cited

U.S. PATENT DOCUMENTS

| | | | |
|---|---|---|---|
| 4,685,303 A * | 8/1987 | Branc et al. ................... 360/69 |
| 6,867,939 B2 * | 3/2005 | Katahara et al. .............. 360/53 |
| 6,995,946 B2 * | 2/2006 | Ding et al. ................ 360/78.07 |
| 7,136,247 B2 * | 11/2006 | Escobar et al. ................. 360/69 |
| 2002/0159354 A1 * | 10/2002 | Nakabayashi ............. 369/53.18 |
| 2003/0081128 A1 * | 5/2003 | Kirmuss ................. 348/207.99 |
| 2004/0228023 A1 * | 11/2004 | Keller et al. ................... 360/69 |
| 2007/0012614 A1 * | 1/2007 | Yoshida ....................... 210/411 |
| 2007/0012615 A1 * | 1/2007 | Yoshida ....................... 210/411 |
| 2007/0153412 A1 * | 7/2007 | Takeda et al. .................. 360/69 |

FOREIGN PATENT DOCUMENTS

| JP | 10-199119 A | 7/1998 |
|---|---|---|
| JP | 10-340521 A | 12/1998 |
| JP | 2000-348479 A | 12/2000 |

* cited by examiner

Primary Examiner—Hoa T Nguyen
Assistant Examiner—James L Habermehl
(74) Attorney, Agent, or Firm—Lerner, David, Littenberg, Krumholz & Mentlik, LLP

(57) ABSTRACT

A disk drive apparatus having access to a disk-shaped recording medium includes: a temperature detecting mechanism configured to detect an internal temperature; and a temperature control mechanism configured to change the disk drive apparatus to either an operating state or a stop state based on a change in the internal temperature, wherein a first temperature and a second temperature are different from each other, the temperature control mechanism changes the disk drive apparatus to the stop state at the first temperature and to the operating state at the second temperature.

12 Claims, 11 Drawing Sheets

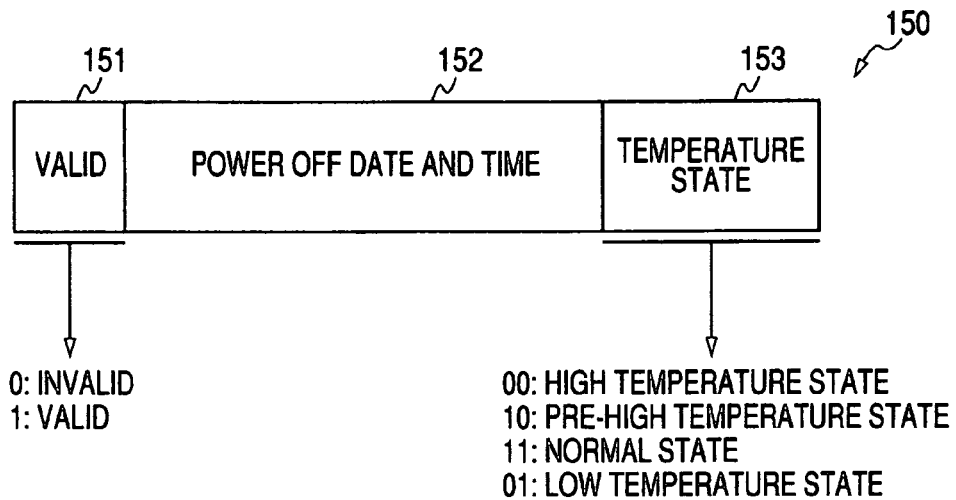

FIG. 7

<NEW TEMPERATURE STATE>

| <TEMPERATURE STATE> | HIGH TEMPERATURE STATE | PRE-HIGH TEMPERATURE STATE | NORMAL STATE | LOW TEMPERATURE STATE |
|---|---|---|---|---|
| HIGH TEMPERATURE STATE | – | – | B > TEMPERATURE ≥ D | D > TEMPERATURE |
| PRE-HIGH TEMPERATURE STATE | TEMPERATURE ≥ A | – | B > TEMPERATURE ≥ D | D > TEMPERATURE |
| NORMAL STATE | TEMPERATURE ≥ A | A > TEMPERATURE ≥ B | – | D > TEMPERATURE |
| LOW TEMPERATURE STATE | TEMPERATURE ≥ A | A > TEMPERATURE ≥ B | B > TEMPERATURE ≥ C | – |

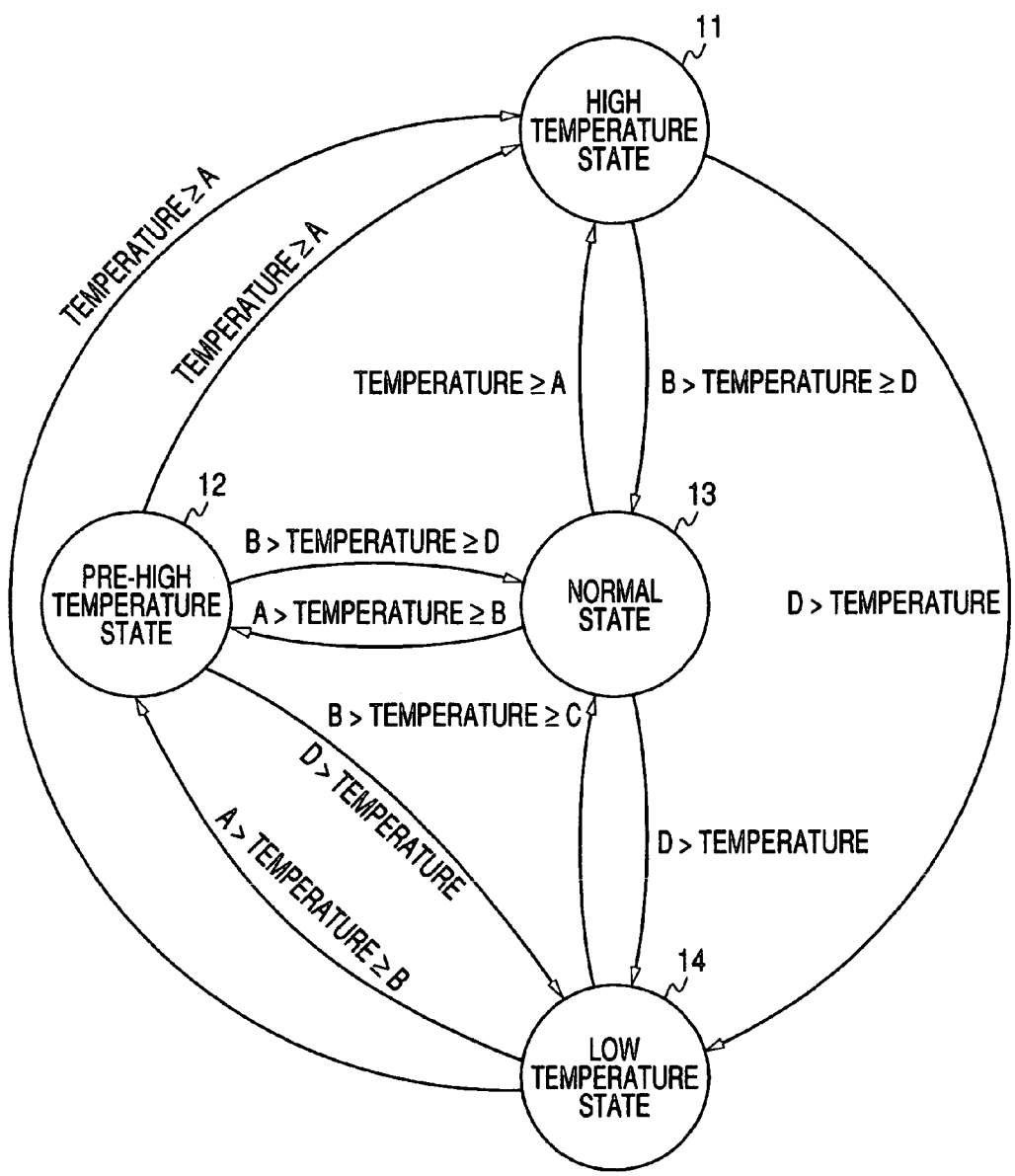

FIG. 9

| <TEMPERATURE STATE> \ <NEW TEMPERATURE STATE> | HIGH TEMPERATURE STATE | PRE-HIGH TEMPERATURE STATE | NORMAL STATE | LOW TEMPERATURE STATE |
|---|---|---|---|---|
| HIGH TEMPERATURE STATE | — | — | DISK STOPPED → OPERATED | (DISK STOPPED) |
| PRE-HIGH TEMPERATURE STATE | DISK OPERATED → STOPPED | — | (DISK OPERATED) | DISK OPERATED → STOPPED |
| NORMAL STATE | DISK OPERATED → STOPPED | (DISK OPERATED) | — | DISK OPERATED → STOPPED |
| LOW TEMPERATURE STATE | (DISK STOPPED) | DISK STOPPED → OPERATED | DISK STOPPED → OPERATED | — |

DISK DRIVE APPARATUS AND IMAGING APPARATUS HAVING THE DISK DRIVE APPARATUS FOR CONTROLLING A STATE THEREOF BASED ON A DETECTED TEMPERATURE

CROSS REFERENCES TO RELATED APPLICATIONS

The present invention contains subject matter related to Japanese Patent Application JP 2005-377666 filed in the Japanese Patent Office on Dec. 28, 2005, the entire contents of which being incorporated herein by reference.

BACKGROUND OF THE INVENTION

1. Field of the Invention

The present invention relates to a disk drive apparatus, particularly to a disk drive apparatus which has access to a disk-shaped recording medium, an imaging apparatus which mounts the disk drive apparatus thereon, a processing method thereof, and a program which allows a computer to execute the method.

2. Description of the Related Art

A disk drive apparatus using a disk-shaped recording medium is used for computer products such as a personal computer as well as for an imaging apparatus such as a digital video camera. With the widespread use of such a disk drive apparatus, the apparatus increasingly has occasions for use under severe temperature environments such as outdoors and cold climate areas.

Generally, the disk drive apparatus has a defined temperature range of use environments. For example, in a hard disk apparatus, in an environment in which the internal temperature extremely drops, these events likely arise that a disk is started to rotate to cause an unusual noise by a resonant mode different from the mode at room temperature, or that an increase in friction resistance occurs because of an increase in viscosity of a lubricant in contact start stop (CSS) of the record surface of the disk contacting with a magnetic head.

Then, an apparatus is proposed in which the internal temperature of a disk drive apparatus is detected to prohibit access to a disk-shaped recording medium when the temperature is equal to or below a predetermined value (for example, see JP-A-10-340521 (FIG. 1) (Patent Reference 1)).

SUMMARY OF THE INVENTION

However, in temperature control in the past, when a warm-up operation is conducted at low temperature and the warm-up operation is finished after the temperature reaches a predetermined temperature, the temperature might again drop below the predetermined temperature right after the operation is finished depending on use environments, causing the restart of the warm-up operation again. This is the same at high temperature, and a cooling operation might be repeated intermittently depending on use environments. It is necessary to stop the operation of the disk drive apparatus under such low temperature and high temperature environments. Thus, the operating state and the stop state are repeated in association with temperature change, causing the unstable operation of the disk drive apparatus as a whole.

Then, it is desirable to prevent the repetition of the operating state and the stop state in temperature control of a disk drive apparatus.

A first embodiment of the invention is a disk drive apparatus having access to a disk-shaped recording medium, including: temperature detecting means for detecting an internal temperature; and temperature control means for changing the disk drive apparatus to either an operating state or a stop state based on a change in the internal temperature, wherein a first temperature and a second temperature are different from each other, and the temperature control means changes the disk drive apparatus to the stop state at the first temperature and to the operating state at the second temperature. Accordingly, an advantage is exerted that hysteresis characteristics are provided to the operation control of the disk drive apparatus.

In addition, the first embodiment may be configured such that in the case in which the first temperature is lower than the second temperature, the temperature control means changes the disk drive apparatus to the stop state when the internal temperature drops from a high temperature to a temperature lower than the first temperature, whereas it changes the disk drive apparatus to the operating state when the internal temperature rises from a low temperature to a temperature higher than the second temperature. Accordingly, an advantage is exerted that the operation at low temperature is stabilized. In addition, at this time, the first embodiment may further include heating means for increasing the internal temperature, wherein the temperature control means activates the heating means when the internal temperature drops from a high temperature to a temperature lower than the first temperature, whereas it stops the heating means when the internal temperature rises from a low temperature to a temperature higher than the second temperature. Accordingly, an advantage is exerted that the operation is quickly stabilized.

In addition, the first embodiment may be configured such that in the case in which the first temperature is higher than the second temperature, the temperature control means changes the disk drive apparatus to the stop state when the internal temperature rises from a low temperature to a temperature higher than the first temperature, whereas it changes the disk drive apparatus to the operating state when the internal temperature drops from a high temperature to a temperature lower than the second temperature. Accordingly, an advantage is exerted that the operation at high temperature is stabilized. In addition, at this time, the first embodiment may further include cooling means for cooling the internal temperature, wherein the temperature control means activates the cooling means when the internal temperature rises from a low temperature to a temperature higher than the first temperature, whereas it stops the cooling means when the internal temperature drops from a high temperature to a temperature lower than the second temperature. Accordingly, an advantage is exerted that the operation is quickly stabilized.

In addition, the first embodiment may further include: manipulation accepting means for accepting a manipulation instruction of power on or off of the disk drive apparatus; and storage means for storing information about the internal temperature when the manipulation instruction of power off is accepted, wherein when the manipulation instruction of power on is accepted, the temperature control means restores a criterion for the internal temperature based on information stored in the storage means. Accordingly, an advantage is exerted that the control state before power off is taken over to allow efficient temperature control. At this time, the first embodiment may further include a timer configured to clock current time, wherein the storage means stores the current time as stored time along with information about the internal temperature, and when the manipulation instruction of power on is accepted, the temperature control means restores a criterion for the internal temperature only when the stored time stored in the storage means is within a predetermined time period from the current time clocked by the timer. Accordingly, an advantage is exerted that restoration matched with the change in environments is allowed.

In addition, a second embodiment of the invention is an imaging apparatus having a disk drive apparatus which has access to a disk-shaped recording medium, the imaging apparatus including: imaging means for imaging an image to record it as image data in the disk drive apparatus; reproducing means for reading the image data out of the disk drive apparatus for reproduction; temperature detecting means for detecting a temperature of the disk drive apparatus; and temperature control means for changing the disk drive apparatus to either an operating state or a stop state based on a change in the temperature of the disk drive apparatus, wherein the temperature control means changes the disk drive apparatus to the stop state at a first temperature and to the operating state at a second temperature, which are different from each other. Accordingly, an advantage is exerted that hysteresis characteristics are provided to the operation control of the imaging apparatus.

In addition, the second embodiment of the invention is a control method of a disk drive apparatus having access to a disk-shaped recording medium, and a program configured to allow a computer to execute procedures in a disk drive apparatus having access to a disk-shaped recording medium, including the steps of: detecting an internal temperature; maintaining the disk drive apparatus in a stop state when the internal temperature is lower than a first temperature; maintaining the disk drive apparatus in an operating state when the internal temperature is higher than a second temperature that is higher than the first temperature; changing the disk drive apparatus to the stop state when the internal temperature drops from a high temperature to a temperature lower than the first temperature; and changing the disk drive apparatus to the operating state when the internal temperature rises from a low temperature to a temperature higher than the second temperature. Accordingly, an advantage is exerted that hysteresis characteristics are provided to the operation control of the operation of the disk drive apparatus.

According to an embodiment of the invention, an excellent advantage can be exerted that the repetition of the operating state and the stop state can be prevented in temperature control of a disk drive apparatus.

BRIEF DESCRIPTION OF THE DRAWINGS

FIG. 2 shows a diagram depicting an exemplary configuration of a last information storage part 150 according to an embodiment of the invention;

FIG. 3 shows a diagram depicting exemplary temperature states according to an embodiment of the invention;

FIG. 7 shows a diagram depicting an exemplary transition table of the temperature states according to an embodiment of the invention;

FIG. 8 shows a diagram depicting an exemplary transition chart of the temperature states according to an embodiment of the invention;

FIG. 9 shows a diagram depicting an exemplary operation control table of a disk drive apparatus 100 according to an embodiment of the invention;

DETAILED DESCRIPTION OF THE INVENTION

Next, an embodiment of the invention will be described in detail with reference to the drawings.

Figure 1:
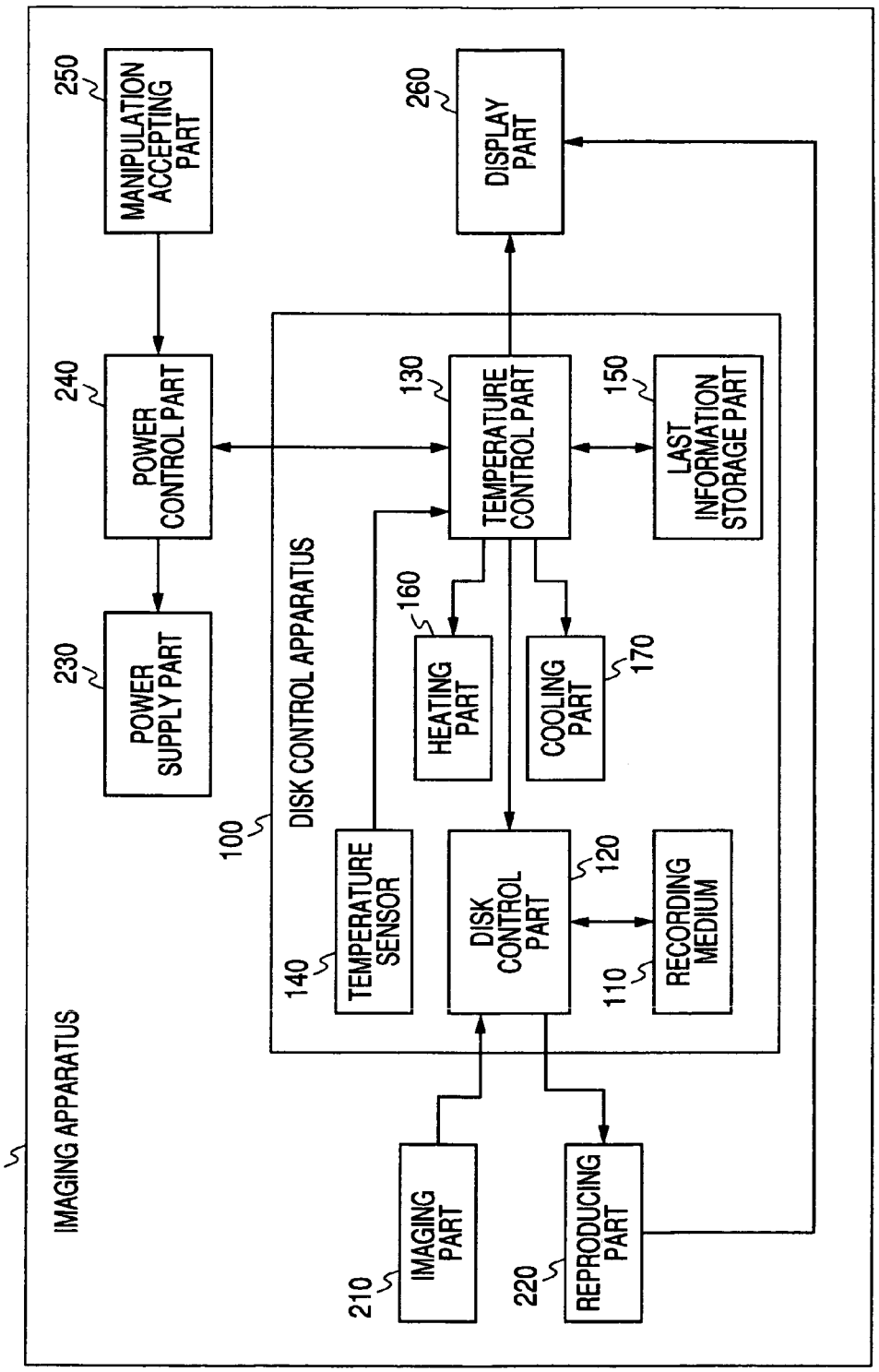
FIG. 1 shows a diagram depicting an exemplary configuration of an imaging apparatus 200 according to an embodiment of the invention.

FIG. 1 shows a diagram depicting an exemplary configuration of an imaging apparatus 200 according to an embodiment of the invention. The imaging apparatus 200 includes a disk drive apparatus 100, and is configured to have an imaging part 210, a reproducing part 220, a power supply part 230, a power control part 240, a manipulation accepting part 250, and a display part 260.

The imaging part 210 images a subject to create image data. The imaging part 210 includes a solid state imaging device which photo-electrically converts subject beams to create an analog image signal. In addition, the imaging part 210 includes an image signal processing function which converts the analog image signal created by the solid state imaging device to a digital image signal. Moreover, the imaging part 210 includes a compression function which compresses and converts the digital image signal. The digital image signal created by the imaging part 210 is written in the disk drive apparatus 100. The reproducing part 220 reproduces the digital image signal read out of the disk drive apparatus 100.

The power supply part 230 supplies power to each part of the imaging apparatus 200. The power control part 240 controls power supply by the power supply part 230. The manipulation accepting part 250 accepts a manipulation input by a user. Here, for the manipulation input done by the user, a manipulation input relating to power manipulation is particularly assumed.

The power control part 240 controls power supply by the power supply part 230 in accordance with the input relating to the power manipulation accepted by the manipulation accepting part 250, and control from the temperature control part 130.

The display part 260 displays the contents reproduced by the reproducing part 220. In addition, the display part 260 displays a warning message created by the disk drive apparatus 100.

In addition, the disk drive apparatus 100 has a recording medium 110, a disk control part 120, a temperature control part 130, a temperature sensor 140, a last information storage part 150, a heating part 160, and a cooling part 170.

The recording medium 110 is a disk-shaped recording medium. The recording medium 110 can record data by magnetic or laser beam irradiation, and it can reproduce data by reproduction laser beams.

The disk control part 120 controls access to the recording medium 110. The disk control part 120 writes the digital image signal supplied from the imaging part 210 to the recording medium 110, and supplies the digital image signal read out of the recording medium 110 to the reproducing part 220.

The temperature sensor 140 senses the internal temperature of the disk drive apparatus 100. The heating part 160 increases the internal temperature of the disk drive apparatus 100. For example, for the heating part 160, a power FET (Field Effect Transistor) can be used. The cooling part 170 decreases the internal temperature of the disk drive apparatus 100. For example, for the cooling part 170, a fan can be used.

The temperature control part 130 controls temperature in the disk drive apparatus 100. The temperature control part 130 instructs the disk control part 120 to operate or stop the disk drive apparatus 100 based on the change in the internal temperature of the disk drive apparatus 100 sensed by the temperature sensor 140, and controls the heating part 160 or the cooling part 170. In addition, the temperature control part 130 creates a warning message to allow the display part 260 to display it as necessary.

The last information storage part 150 stores the temperature state when the power is turned off. The temperature control part 130 reads the descriptions of the last information storage part 150 when the power is turned on next time, and restores the temperature state. The timing to turn off or on power is sent from the power control part 240 to the temperature control part 130.

It is necessary for the last information storage part 150 to maintain the stored descriptions in the state in which the power of the imaging apparatus 200 is turned off. Therefore, for example, a nonvolatile recording medium such as a flash memory is used.

FIG. 2 shows a diagram depicting an exemplary configuration of the last information storage part 150 according to an embodiment of the invention. The last information storage part 150 is configured of fields: a valid flag 151, a power off date and time 152, and a temperature state 153.

The valid flag 151 is a flag indicating whether the descriptions stored in the last information storage part 150 are valid or not. For example, it is assumed that the flag means invalid when it is "0", whereas it means valid when it is "1".

The power off date and time 152 is a filed indicating that the date and time when power is turned off last time. In other words, the power off date and time 152 expresses the date and time when the temperature state 153 is stored.

The temperature state 153 is a field indicting that the temperature state of the disk drive apparatus 100 when power is turned off last time. In an embodiment of the invention, four temperature states are assumed. For example, "00" expresses a high temperature state, "10" expresses a pre-high temperature state, "11" expresses a normal state, and "01" expresses a low temperature state.

FIG. 3 shows a diagram depicting exemplary temperature states according to an embodiment of the invention. As described above, in an embodiment of the invention, four temperature states are assumed: the high temperature state, the pre-high temperature state, the normal state, and the low temperature state.

The high temperature state is a state in which the internal temperature of the disk drive apparatus 100 is high, so that it is difficult to operate the disk drive apparatus 100. The pre-high temperature state is a state in which the internal temperature of the disk drive apparatus 100 is rising high, so that the disk drive apparatus 100 might not be operated when the temperature is kept rising. The low temperature state is a state in which the internal temperature of the disk drive apparatus 100 is low, so that it is difficult to operate the disk drive apparatus 100. The normal state is a state in which the internal temperature of the disk drive apparatus 100 is at the correct level that the temperature is neither too high nor too low.

In the high temperature state, the temperature control part 130 allows the display part 260 to display a warning that it is high temperature as well as allows the disk control part 120 to stop the operation of the disk drive apparatus 100. In addition, in the pre-high temperature state, the temperature control part 130 allows the display part 260 to display a warning that it is high temperature, but it does not stop the operation of the disk drive apparatus 100. In the low temperature state, the temperature control part 130 allows the display part 260 to display a warning that it is low temperature as well as allows the disk control part 120 to stop the operation of the disk drive apparatus 100. In the normal state, the disk drive apparatus 100 is kept operated with no warning.

The temperature states are changed all the time, and the descriptions are managed inside the temperature control part 130.

Figure 4:
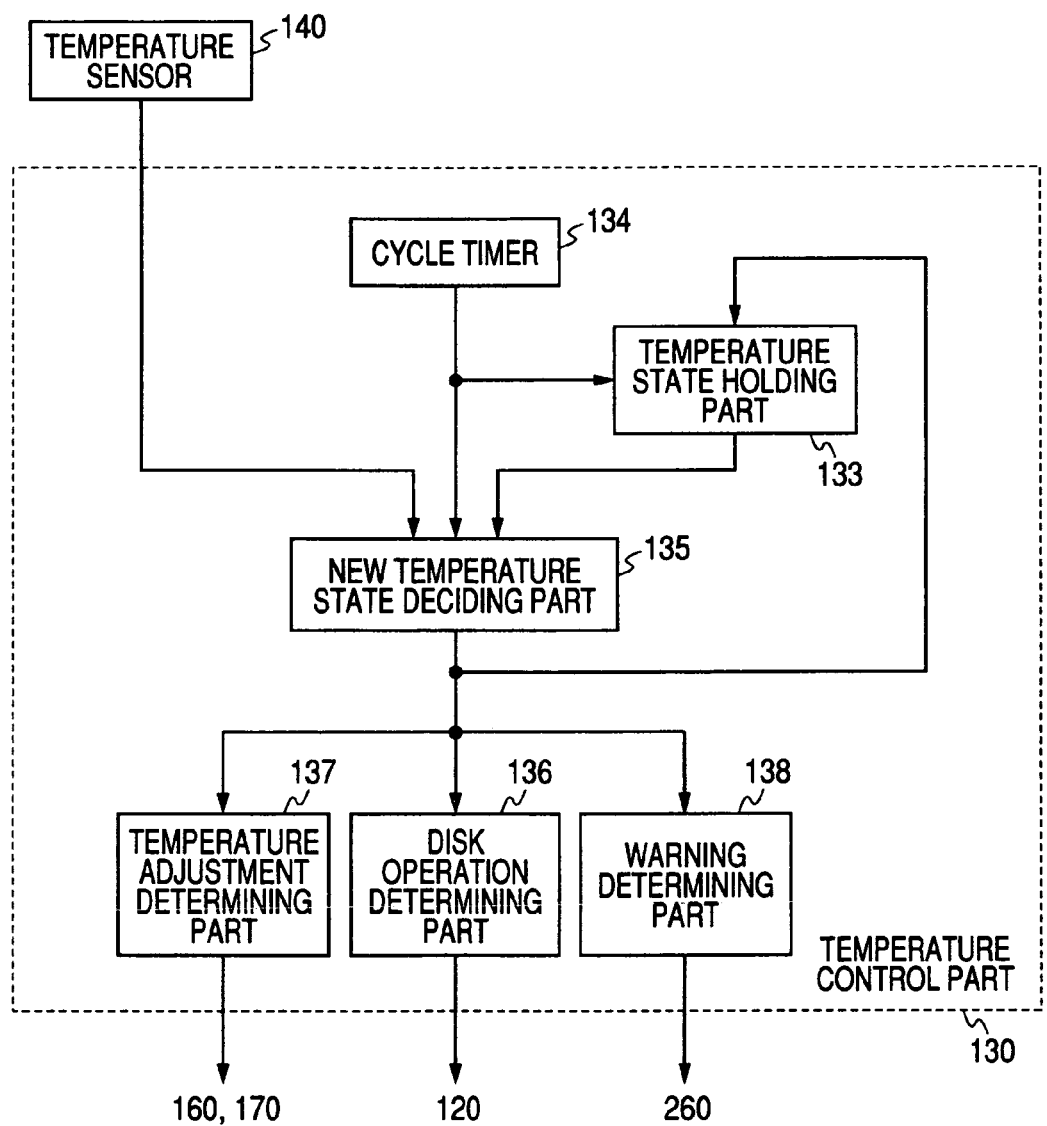
FIG. 4 shows a diagram depicting exemplary temperature state management functions of a temperature control part 130 according to an embodiment of the invention.

FIG. 4 shows a diagram depicting exemplary temperature state management functions of the temperature control part 130 according to an embodiment of the invention. Here, for the functions of the temperature control part 130, a temperature state holding part 133, a cycle timer 134, a new temperature state deciding part 135, a disk operation determining part 136, a temperature adjustment determining part 137, and a warning determining part 138 are shown.

The temperature state holding part 133 holds the temperature state described in FIG. 3. The temperature states are changed all the time, and the new temperature state is decided by the new temperature state deciding part 135. In addition, the cycle to update the temperature state held by the temperature state holding part 133 is clocked by the cycle timer 134. The cycle timer 134 clocks a single cycle for about 16.6 to 20 milliseconds, for example. The new temperature state deciding part 135 decides a new temperature state based on the temperature state held by the temperature state holding part 133 and the temperature sensed by the temperature sensor 140.

The disk operation determining part 136 determines the new operation state of the disk drive apparatus 100 in accordance with the new temperature state. The disk operation determining part 136 instructs the disk control part 120 whether to operate or stop the disk drive apparatus 100 depending on the determined result.

The temperature adjustment determining part 137 determines the necessity whether to adjust the temperature in accordance with the new temperature state. The temperature adjustment determining part 137 makes instructions whether to operate or stop the heating part 160 or the cooling part 170 depending on the determined result.

The warning determining part 138 determines the necessity whether to display a warning in accordance with the new temperature state. The warning determining part 138 creates a warning message depending on the determined result, and allows the display part 260 to display it.

In addition, the decision scheme of the new temperature state and the operations based on the new temperature state will be described later.

Figure 5:
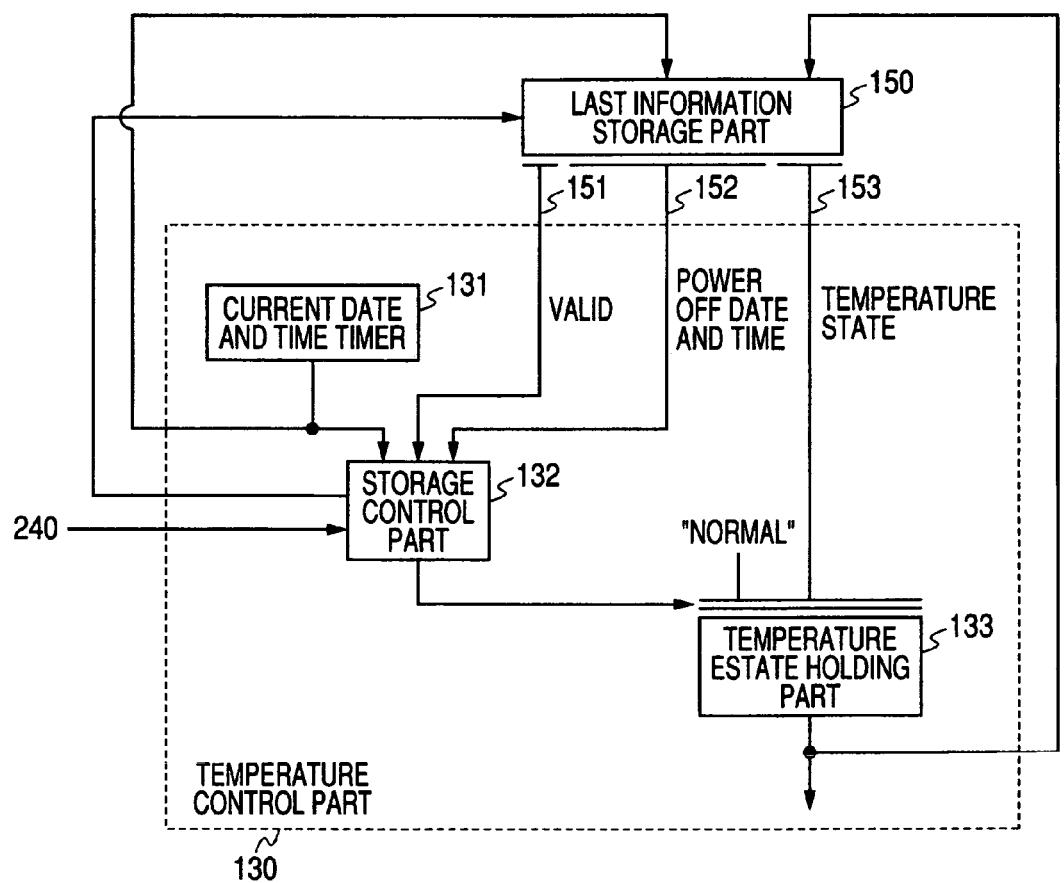
FIG. 5 shows a diagram depicting exemplary temperature state storage functions of the temperature control part 130 according to an embodiment of the invention.

FIG. 5 shows a diagram depicting exemplary temperature state storage functions of the temperature control part 130 according to an embodiment of the invention. Here, for the functions of the temperature control part 130, a current date and time timer 131, a storage control part 132, and a temperature state holding part 133 are shown.

The current date and time timer 131 clocks a current date and time. The temperature state holding part 133 holds the temperature state as described above. The storage control part 132 conducts control so as to store the temperature state between power off and power on.

When the storage control part 132 receives an event of the occurrence of power off from the power control part 240, it stores the descriptions of the current date and time timer 131 and the temperature state holding part 133 in the last information storage part 150. In other words, it stores the descriptions of the current date and time timer 131 in the power off date and time 152 of the last information storage part 150, and stores the descriptions of the temperature state holding part 133 in the temperature state 153 of the last information storage part 150. In addition, at this time, the storage control part 132 turns the valid flag 151 "valid".

When the storage control part 132 receives an event of the occurrence of power on from the power control part 240, it compares the descriptions of the power off date and time 152 of the last information storage part 150 with the descriptions of the current date and time timer 131, and determines whether it is within a predetermined time period (for example, within 30 minutes) from the power off time to the current time. When it is within a predetermined time period, the descriptions of the temperature state 153 of the last information storage part 150 are stored in the temperature state holding part 133. On the other hand, when it is not within a predetermined time period, "the normal state" is held in the temperature state holding part 133. At this time, the storage control part 132 turns the valid flag 151 "invalid".

Figure 6:
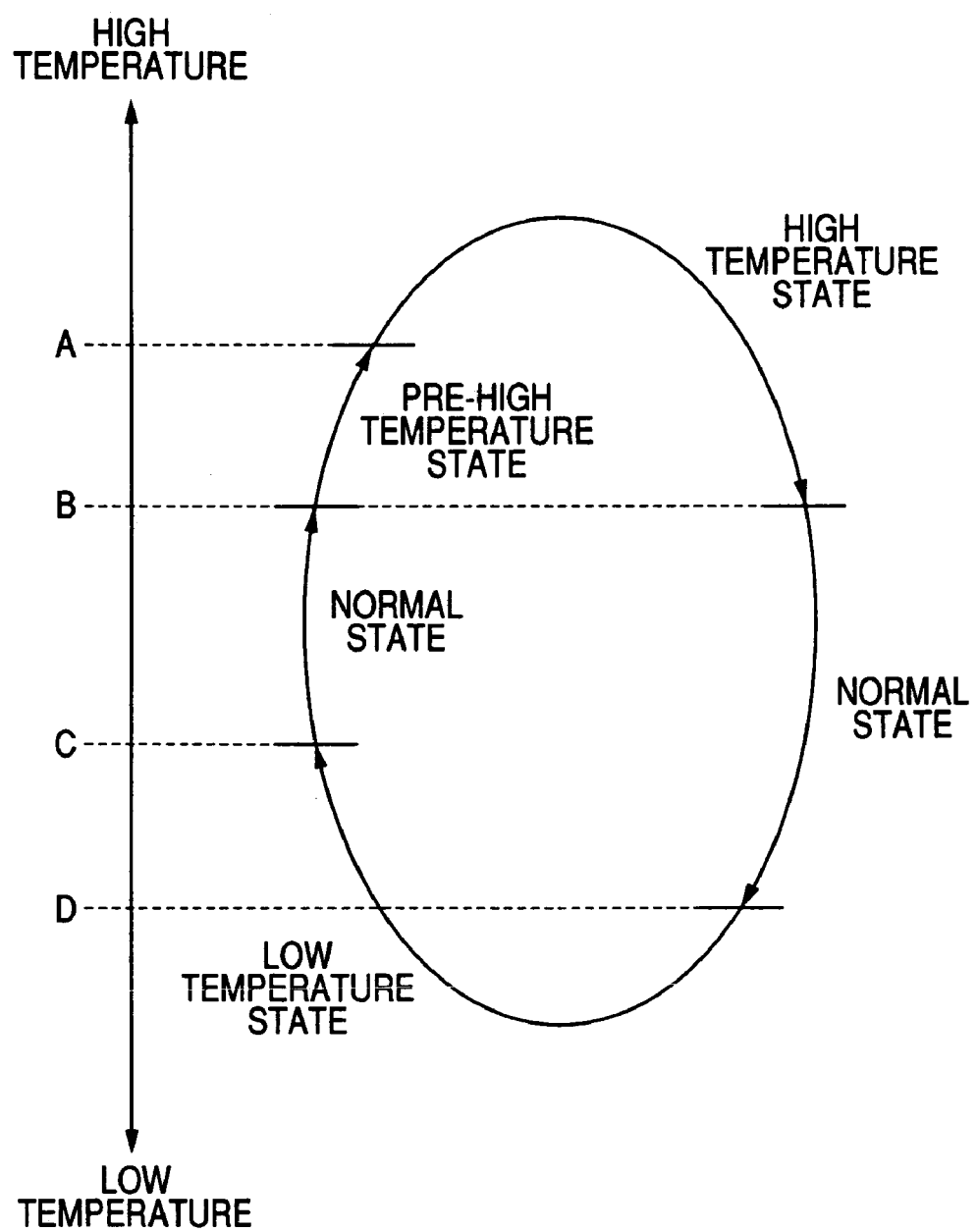
FIG. 6 shows a diagram depicting an exemplary transition cycle of the temperature states according to an embodiment of the invention.

FIG. 6 shows a diagram depicting an exemplary transition cycle of the temperature states according to an embodiment of the invention. Here, for the temperature of the disk drive apparatus 100, such reference values are assumed in descending order: temperature A, temperature B, temperature C, and temperature D. For example, it is assumed that the temperature A is 60° C., the temperature B is 40° C., the temperature C is 20° C., and the temperature D is 0° C.

When the temperature of the disk drive apparatus 100 exceeds the temperature A, it is turned to the high temperature state, in which the high temperature state is maintained until the temperature drops to below the temperature B. When the temperature drops from the high temperature state to below the temperature B, it is turned to the normal state, and the normal state is maintained until the temperature drops to below the temperature D. When the temperature drops from the normal state to below the temperature D, it is turned to the low temperature state, and the low temperature state is maintained until the temperature rises to exceed the temperature C. When the temperature rises from the low temperature state and exceeds the temperature C, it is turned to the normal state, and the normal state is maintained until the temperature rises to exceed the temperature B. When the temperature rises from the normal state and exceeds the temperature B, it is turned to the pre-high temperature state, and the pre-high temperature state is maintained until the temperature further rises to exceed the temperature A. These are called the transition cycle of the temperature states.

FIG. 7 shows a diagram depicting an exemplary transition table of the temperature states according to an embodiment of the invention. In the transition table, the original temperature states are arranged in the vertical direction, and new temperature states are arranged in the lateral direction. Then, at each of the intersection points, the range of the current temperature sensed by the temperature sensor 140 is shown as a transition condition.

In other words, in the case in which the original temperature state is the high temperature state, when the current temperature is equal to or above the temperature D and below the temperature B, it is changed to the normal state as a new temperature state, whereas when the current temperature is below the temperature D, it is changed to the low temperature state as a new temperature state.

In addition, in the case in which the original temperature state is the pre-high temperature state, when the current temperature is equal to or above the temperature A, it is changed to the high temperature state as a new temperature state, when the current temperature is equal to or above the temperature D and below the temperature B, it is changed to the normal state as a new temperature state, and when the current temperature is below the temperature D, it is changed to the low temperature state as a new temperature state.

In addition, in the case in which the original temperature state is the normal state, when the current temperature is the temperature A or above, it is changed to the high temperature state as a new temperature state, when the current temperature is equal to or above the temperature B and below the temperature A, it is changed to the pre-high temperature state as a new temperature state, and when the current temperature is below the temperature D, it is changed to the low temperature state as a new temperature state.

In addition, in the case in which the original temperature state is the low temperature state, when the current temperature is equal to or above the temperature A, it is changed to the high temperature state as a new temperature state, when the current temperature is equal to or above the temperature B and below the temperature A, it is changed to the pre-high temperature state as a new temperature state, and when the current temperature is equal to or above the temperature C and below the temperature B, it is changed to the normal state as a new temperature state.

A transition chart shown in FIG. 8 depicts these transition conditions. In the transition chart, arrows are added with conditions necessary to change the states among the high temperature state 11, the pre-high temperature state 12, the normal state 13 and the low temperature state 14.

FIG. 9 shows a diagram depicting an exemplary control table of the operation of the disk drive apparatus 100 according to an embodiment of the invention. In the operation control table, the original temperature states are arranged in the vertical direction, and new temperature states are arranged in the lateral direction. Then, at each of the intersection points, the control descriptions of the temperature control part 130 from the disk operation determining part 136 to the disk control part 120 are shown.

In the case in which the original temperature state is the high temperature state, when it is changed to the normal state, the disk drive apparatus 100 is changed from the stop state to the operating state, and when it is changed to the low temperature state, the disk drive apparatus 100 maintains the stop state.

In addition, in the case in which the original temperature state is the pre-high temperature state, when it is changed to the high temperature state or the low temperature state, the disk drive apparatus 100 is changed from the operating state to the stop state, and when it is changed to the normal state, the disk drive apparatus 100 maintains the operating state.

In addition, in the case in which the original temperature state is the normal state, when it is changed to the high temperature state or the low temperature state, the disk drive apparatus 100 is changed from the operating state to the stop state, and when it is changed to the pre-high temperature state, the disk drive apparatus 100 maintains the operating state.

In addition, in the case in which the original temperature state is the low temperature state, when it is changed to the high temperature state, the disk drive apparatus 100 maintains the stop state, and when it is changed to the pre-high temperature state or the normal state, the disk drive apparatus 100 is changed from the stop state to the operating state.

In other words, as apparent from FIG. 3, when the new temperature state is the high temperature state or the low temperature state, the disk drive apparatus 100 is turned to the stop state, whereas when the new temperature state is the normal state or the pre-high temperature state, the disk drive apparatus 100 is turned to the operating state.

Next, the operation of the imaging apparatus 200 according to an embodiment of the invention will be described with reference to the drawings.

Figure 10:
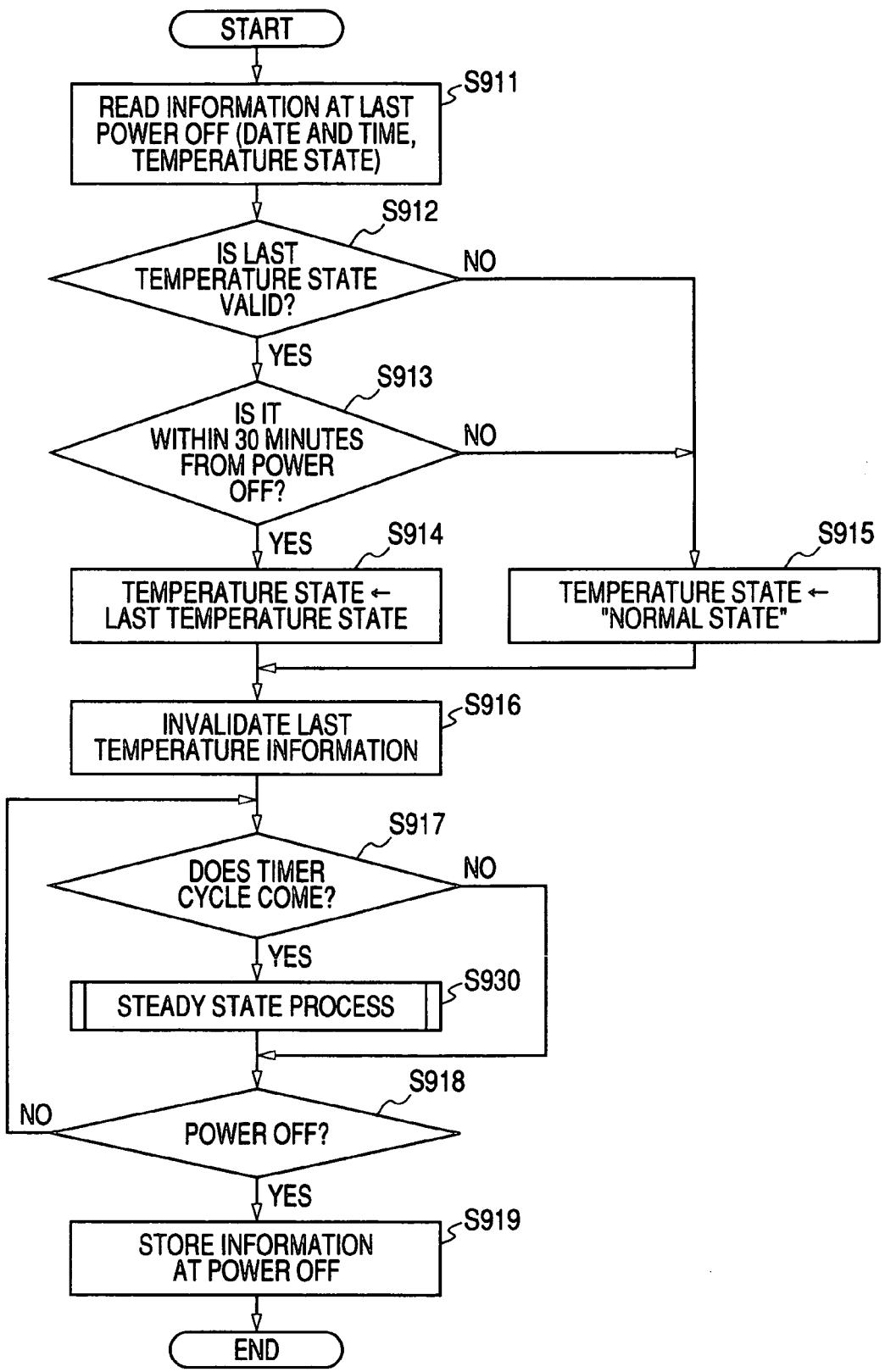
FIG. 10 shows a diagram depicting exemplary process procedures of the imaging apparatus 200 according to an embodiment of the invention.

FIG. 10 shows a diagram depicting exemplary process procedures of the imaging apparatus 200 according to an embodiment of the invention. First, when the manipulation accepting part 250 accepts a power on manipulation, the event is sent to the storage control part 132 through the power control part 240 to read the descriptions of the last information storage part 150 (Step S911).

At this time, when the valid flag 151 of the last information storage part 150 indicates "valid" (Step S912) and a time period from the power off date and time 152 to the current point in time clocked by the current date and time timer 131 is within a predetermined time period (in this example, within 30 minutes) (Step S913), the temperature state 153 is held in the temperature state holding part 133 (Step S914). On the other hand, when the valid flag 151 of the last information storage part 150 indicates "invalid" (Step S912), or when a time period from the power off date and time 152 to the current point in time exceeds a predetermined time period (Step S913), "the normal state" is held in the temperature state holding part 133 (Step S915).

Subsequently, the valid flag 151 of the last information storage part 150 is turned "invalid" (Step S916).

After that, until the manipulation accepting part 250 accepts a power off manipulation (Step S918), a steady state process is conducted (Step S930) at every time when the cycle of the cycle timer 134 comes (for example, about 16.6 to 20 milliseconds) (Step S917).

When the manipulation accepting part 250 accepts a power off manipulation, the event is sent to the storage control part 132 through the power control part 240, and the descriptions of the current date and time timer 131 and the temperature state holding part 133 are stored in the last information storage part 150 (Step S919).

Figure 11:
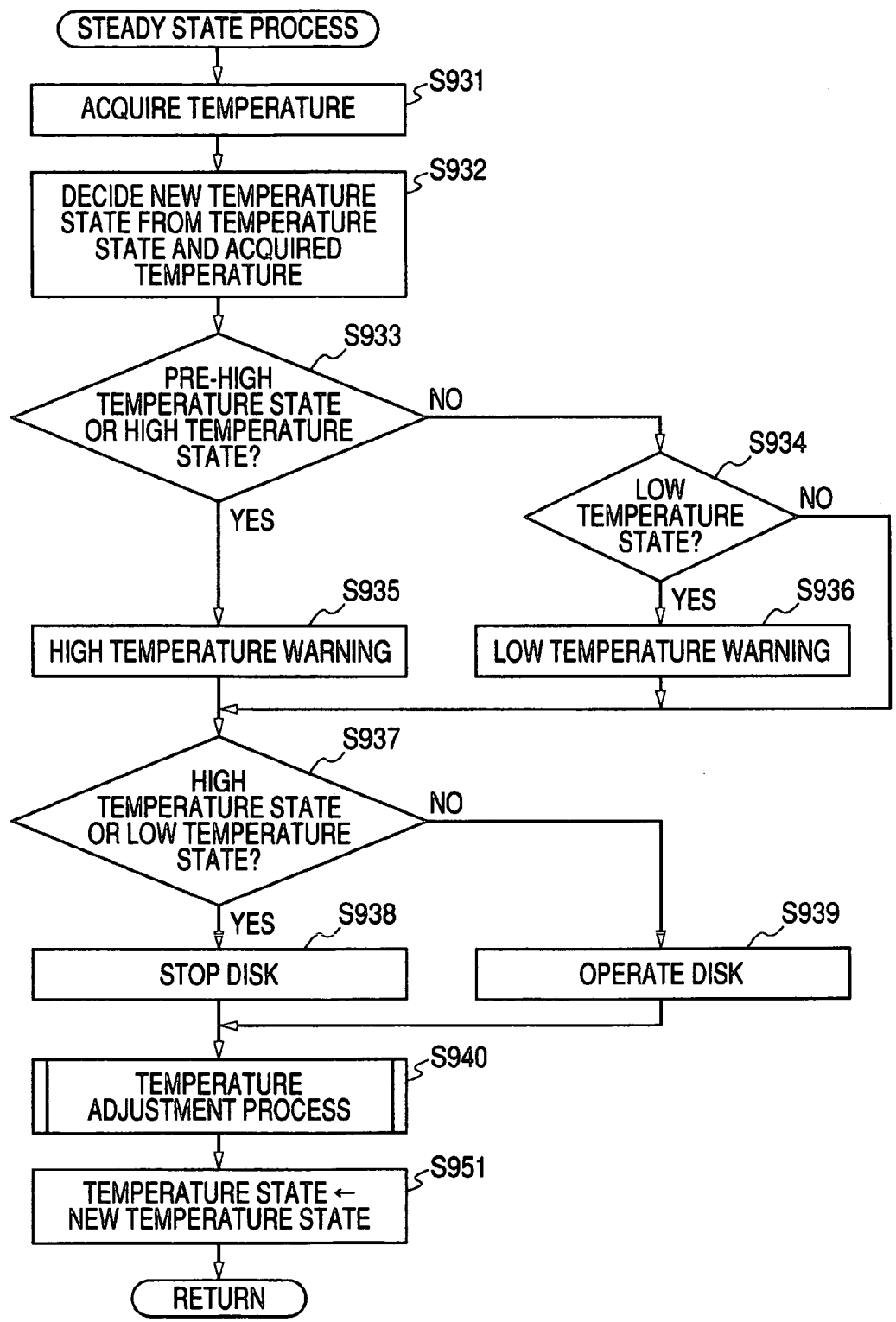
FIG. 11 shows a diagram depicting exemplary process procedures of a steady state process according to an embodiment of the invention.

FIG. 11 shows a diagram depicting exemplary process procedures of the steady state process (Step S930) according to an embodiment of the invention. The steady state process is conducted at regular time intervals in accordance with the cycle of the cycle timer 134. First, the temperature sensor 140 acquires the temperature of the disk drive apparatus 100 (Step S931), and the new temperature state deciding part 135 decides a new temperature state based on the temperature and the temperature state held in the temperature state holding part 133 (Step S932).

When the decided new temperature state is the high temperature state or the pre-high temperature state (Step S 933), the warning determining part 138 allows the display part 260 to display a warning that it is high temperature (Step S935). On the other hand, when the decided new temperature state is the low temperature state (Step S934), the warning determining part 138 allows the display part 260 to display a warning that it is low temperature (Step S936). In other words, when the decided new temperature state is the normal state, no warning is displayed.

In addition, when the decided new temperature state is the high temperature state or the low temperature state (Step S937), the disk operation determining part 136 turns the operation of the disk drive apparatus 100 to the stop state (Step S938). On the other hand, when the decided new temperature state is the normal state or the pre-high temperature state (Step S937), the operation of the disk drive apparatus 100 is turned to the operating state (Step S939).

Subsequently, after the temperature adjustment process is conducted through the temperature adjustment determining part 137 as necessary (Step S940), the new temperature state decided at Step S932 is held in the temperature state holding part 133 (Step S951).

Figure 12:
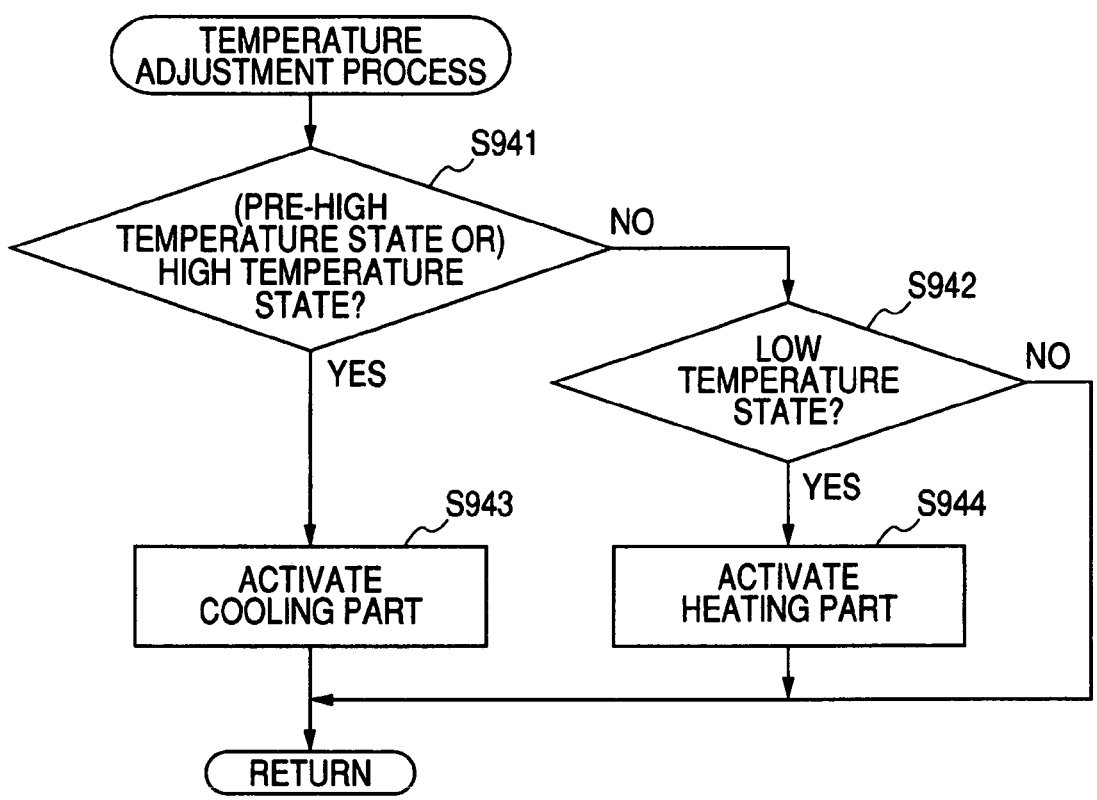
FIG. 12 shows a diagram depicting exemplary process procedures of a temperature adjustment process according to an embodiment of the invention.

FIG. 12 shows a diagram depicting exemplary process procedures of the temperature adjustment process (Step S940) according to an embodiment of the invention. The temperature adjustment process is conducted as necessary in the steady state process (Step S930).

As an example, when the decided new temperature state is the high temperature state or the pre-high temperature state at Step S932 (Step S941), the temperature adjustment determining part 137 activates the cooling part 170 (Step S943). When the decided new temperature state is the low temperature state (Step S942), the temperature adjustment determining part 137 activates the heating part 160 (Step S944).

In addition, for another example, the pre-high temperature state may be excluded from the condition that activates the cooling part 170 at Step S943 as long as the decided new temperature state is the high temperature state.

In addition, here, the example is described that the cooling part 170 is activated when cooling is necessary, an embodiment of the invention is not limited thereto. For example, it may be assumed that a fan is operated all the time and the rotation speed of the fan is accelerated to improve the cooling effect when cooling is necessary.

In addition, here, the example of temperature control is described that the heating part 160 and the cooling part 170 are used, but an embodiment of the invention is not limited thereto. For example, this scheme may be done in which the imaging apparatus 200 is operated while the operation of the disk drive apparatus 100 is stopped at low temperature to wait a temperature rise in association with the operation. Alternatively, this scheme may be done in which the operation of the disk drive apparatus 100 is stopped to wait a natural temperature drop at high temperature.

As described above, according to an embodiment of the invention, the new temperature state deciding part 135 decides the new temperature state based on the temperature sensed by the temperature sensor 140 and the temperature state held in the temperature state holding part 133, whereby hysteresis characteristics can be provided to the operation of the disk drive apparatus control.

In addition, an embodiment of the invention shows exemplary implementations to embody an embodiment of the invention, and has correspondences to specific inventive matters within the scope of the invention, which however is not limited thereto, and various modifications can be made within the scope of the teachings of the invention.

In other words, in an embodiment of the invention, a temperature detecting mechanism corresponds to the temperature sensor 140, for example. In addition, a temperature control mechanism corresponds to the temperature control part 130, for example. In addition, the first temperature corresponds to the temperature A or the temperature D, for example. In addition, the second temperature corresponds to the temperature B or the temperature C, for example.

In addition, in an embodiment of the invention, a heating mechanism corresponds to the heating part 160, for example.

In addition, in an embodiment of the invention, a cooling mechanism corresponds to the cooling part 170, for example.

In addition, in an embodiment of the invention, a manipulation accepting mechanism corresponds to the manipulation accepting part 250, for example. In addition, a storage mechanism corresponds to the last information storage part 150, for example.

In addition, in an embodiment of the invention, a timer corresponds to the cycle timer 134, for example.

In addition, in an embodiment of the invention, an imaging mechanism corresponds to the imaging part 210, for example. In addition, a reproducing mechanism corresponds to the reproducing part 220, for example. In addition, a temperature detecting mechanism corresponds to the temperature sensor 140, for example. In addition, a temperature control mechanism corresponds to the temperature control part 130, for example. In addition, the first temperature corresponds to the temperature A or the temperature D, for example. In addition, the second temperature corresponds to the temperature B or the temperature C, for example.

In addition, in an embodiment of the invention, the procedure of detecting the internal temperature corresponds to Step S931, example. In addition, the procedure of maintaining the disk drive apparatus in the stop state when the internal temperature is lower than the first temperature and the procedure of changing the disk drive apparatus to the stop state when the internal temperature drops from a high temperature to a temperature lower than the first temperature correspond to Step S938, for example. In addition, the procedure of maintaining the disk drive apparatus in the operating state when the internal temperature is higher than the second temperature that is higher than the first temperature, and the procedure of changing the disk drive apparatus to the operating state when the internal temperature rises from a low temperature to a temperature higher than the second temperature correspond to Step S939, for example.

In addition, the process procedures described in an embodiment of the invention may be grasped as a method having a sequence of the procedures. Alternatively, they may be grasped as a program and a recording medium to allow a computer to execute a series of the procedures.

It should be understood by those skilled in the art that various modifications, combinations, sub-combinations and alterations may occur depending on design requirements and other factors insofar as they are within the scope of the appended claims or the equivalents thereof.

What is claimed is:

1. A disk drive apparatus having access to a disk-shaped recording medium, comprising:
    temperature detecting means for detecting an internal temperature;
    temperature control means for changing the disk drive apparatus to either an operating state or a stop state based on a change in the internal temperature; and
    storage means for storing information pertaining to the internal temperature when power for the disk drive apparatus is turned off,
    wherein a first temperature and a second temperature are different from each other, and the temperature control means changes the disk drive apparatus to the stop state at the first temperature and to the operating state at the second temperature, and
    the temperature control means restores a criterion of the internal temperature based on the information stored in the storage means when power for the disk drive apparatus is turned on.

2. The disk drive apparatus according to claim 1,
    wherein the first temperature is lower than the second temperature,
    wherein the temperature control means changes the disk drive apparatus to the stop state when the internal temperature drops from a high temperature to a temperature lower than the first temperature, whereas it changes the disk drive apparatus to the operating state when the internal temperature rises from a low temperature to a temperature higher than the second temperature.

3. The disk drive apparatus according to claim 2, further comprising:
    heating means for increasing the internal temperature,
    wherein the temperature control means activates the heating means when the internal temperature drops from a high temperature to a temperature lower than the first temperature, whereas it stops the heating means when the internal temperature rises from a low temperature to a temperature higher than the second temperature.

4. The disk drive apparatus according to claim 1,
    wherein the first temperature is higher than the second temperature,
    wherein the temperature control means changes the disk drive apparatus to the stop state when the internal temperature rises from a low temperature to a temperature higher than the first temperature, whereas it changes the disk drive apparatus to the operating state when the internal temperature drops from a high temperature to a temperature lower than the second temperature.

5. The disk drive apparatus according to claim 4, further comprising:
    cooling means for cooling the internal temperature,
    wherein the temperature control means activates the cooling means when the internal temperature rises from a low temperature to a temperature higher than the first temperature, whereas it stops the cooling means when the internal temperature drops from a high temperature to a temperature lower than the second temperature.

6. A disk drive apparatus having access to a disk-shaped recording medium, comprising:
    temperature detecting means for detecting an internal temperature;
    temperature control means for changing the disk drive apparatus to either an operating state or a stop state based on a change in the internal temperature;
    manipulation accepting means for accepting a manipulation instruction of power on or off of the disk drive apparatus; and
    storage means for storing information about the internal temperature when the manipulation instruction of power off is accepted,
    wherein a first temperature and a second temperature are different from each other, and the temperature control means changes the disk drive apparatus to the stop state at the first temperature and to the operating state at the second temperature, and
    wherein when the manipulation instruction of power on is accepted, the temperature control means restores a criterion for the internal temperature based on information stored in the storage means.

7. The disk drive apparatus according to claim 6, further comprising:
    a timer configured to clock current time,
    wherein the storage means stores the current time as stored time along with information about the internal temperature, and
    when the manipulation instruction of power on is accepted, the temperature control means restores a criterion for the internal temperature only when the stored time stored in the storage means is within a predetermined time period from the current time clocked by the timer.

8. An imaging apparatus having a disk drive apparatus which has access to a disk-shaped recording medium, the imaging apparatus comprising:

imaging means for imaging an image to record it as image data in the disk drive apparatus;

reproducing means for reading the image data out of the disk drive apparatus for reproduction;

temperature detecting means for detecting a temperature of the disk drive apparatus;

temperature control means for changing the disk drive apparatus to either an operating state or a stop state based on a change in the temperature of the disk drive apparatus; and storage means for storing information pertaining to the temperature of the disk drive apparatus when power for the disk drive apparatus is turned off, wherein the temperature control means changes the disk drive apparatus to the stop state at a first temperature and to the operating state at a second temperature, which are different from each other, and the temperature control means restores a criterion of the temperature of the disk drive apparatus based on the information stored in the storage means when power for the disk drive apparatus is turned on.

9. A control method of a disk drive apparatus having access to a disk-shaped recording medium, comprising the steps of:

detecting an internal temperature;

maintaining the disk drive apparatus in a stop state when the internal temperature is lower than a first temperature;

maintaining the disk drive apparatus in an operating state when the internal temperature is higher than a second temperature that is higher than the first temperature;

changing the disk drive apparatus to the stop state when the internal temperature drops from a high temperature to a temperature lower than the first temperature; and changing the disk drive apparatus to the operating state when the internal temperature rises from a low temperature to a temperature higher than the second temperature;

storing information pertaining to the internal temperature when power for the disk drive apparatus is turned off; and restoring a criterion of the internal temperature based on the stored information pertaining to the internal temperature when power for the disk drive apparatus is turned on.

10. A computer readable medium having stored thereon a computer readable program configured to allow a computer to execute procedures in a disk drive apparatus having access to a disk-shaped recording medium, said program comprising the steps of:

detecting an internal temperature;

maintaining the disk drive apparatus in a stop state when the internal temperature is lower than a first temperature;

maintaining the disk drive apparatus in an operating state when the internal temperature is higher than a second temperature that is higher than the first temperature;

changing the disk drive apparatus to the stop state when the internal temperature drops from a high temperature to a temperature lower than the first temperature; and changing the disk drive apparatus to the operating state when the internal temperature rises from a low temperature to a temperature higher than the second temperature;

storing information pertaining to the internal temperature when power for the disk drive apparatus is turned off; and restoring a criterion of the internal temperature based on the stored information pertaining to the internal temperature when power for the disk drive apparatus is turned on.

11. A disk drive apparatus having access to a disk-shaped recording medium, comprising:

a temperature detecting mechanism configured to detect an internal temperature; and a temperature control mechanism configured to change the disk drive apparatus to either an operating state or a stop state based on a change in the internal temperature; and a storage unit to store information pertaining to the internal temperature when power for the disk drive apparatus is turned off, wherein a first temperature and a second temperature are different from each other, the temperature control mechanism changes the disk drive apparatus to the stop state at the first temperature and to the operating state at the second temperature, and the temperature control mechanism restores a criterion of the internal temperature based on the information stored in the storage unit when power for the disk drive apparatus is turned on.

12. An imaging apparatus having a disk drive apparatus having access to a disk-shaped recording medium, the imaging apparatus comprising:

an imaging mechanism configured to image an image to record it as image data in the disk drive apparatus;

a reproducing mechanism configured to read the image data out of the disk drive apparatus for reproduction;

a temperature detecting mechanism configured to detect a temperature of the disk drive apparatus; and a temperature control mechanism configured to change the disk drive apparatus to either operating state or stop state based on a change in the temperature of the disk drive apparatus; and a storage unit to store information pertaining to the temperature of the disk drive apparatus when power for the disk drive apparatus is turned off, wherein the temperature control mechanism changes the disk drive apparatus to the stop state when the internal temperature drops from a high temperature to a temperature lower than the first temperature, whereas it changes the disk drive apparatus to the operating state when the internal temperature rises from a low temperature to a temperature higher than the second temperature, and the temperature control mechanism restores a criterion of the temperature of the disk drive apparatus based on the information stored in the storage unit when power for the disk drive apparatus is turned on.

* * * * *